United States Patent
Stuurman (10) Patent No.: US 9,817,824 B2
(45) Date of Patent: Nov. 14, 2017

(54) METHOD AND SYSTEM FOR PROVIDING A DOCUMENT IN A DATA COMMUNICATION NETWORK

(71) Applicant: Knollenstein Technologies B.V., Hilversum (NL)

(72) Inventor: Willem-Paul Stuurman, Blaricum (NL)

(73) Assignee: Knollenstein Technologies B.V., Hilversum (NL)

( * ) Notice: Subject to any disclaimer, the term of this patent is extended or adjusted under 35 U.S.C. 154(b) by 403 days.

(21) Appl. No.: 14/121,852

(22) Filed: Oct. 24, 2014

(65) Prior Publication Data

US 2015/0339297 A1 Nov. 26, 2015

(30) Foreign Application Priority Data

May 22, 2014 (NL) .................................. 2012867

(51) Int. Cl.
- *G06F 17/30* (2006.01)
- *G06Q 10/10* (2012.01)
- *G06F 21/62* (2013.01)

(52) U.S. Cl.
CPC .. *G06F 17/30011* (2013.01); *G06F 17/30864* (2013.01); *G06F 17/30893* (2013.01); *G06F 21/6209* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 2011/0238859 A1 | 9/2011 | Kitagata | |
| 2012/0297450 A1* | 11/2012 | Whittick | H04L 63/08 726/3 |
| 2013/0074139 A1* | 3/2013 | Cope | H04N 9/8205 725/114 |

OTHER PUBLICATIONS

Fairsail. http://help.fairsail.com/Fairsail%20Recruit%20Guide%20for%20Administrators.pdf, p. 244. 2011.*
International Search Report for NL 2012867, dated Jan. 22, 2015.
Jeffry Thurana; "Otixo: Access All of Your Cloud Accounts & Files From One Place"; Jun. 16, 2011; URL:http://www.makeuseof.com/tag/otixo-access-cloud-accounts-files-place/.
Wikipedia; "URL Redirection"; Mar. 4, 2009; URL:http://en.wikipedia.org/w/index.php?title=URL_redirection&oldid=274885731.

* cited by examiner

*Primary Examiner* — Syed Hasan
(74) *Attorney, Agent, or Firm* — Hoffmann & Baron, LLP (57) ABSTRACT

In a computer-implemented method and system, an electronic target document is provided in a data communication network. At least one computer program in a first domain in the data communication network provides a link to open a digital first form in the first domain. Upon activation of the link, redirection to a second domain takes place, and a second electronic form is provided in the second domain. The second form comprises a retrieval field which is configured to provide, when the retrieval field is activated, a plurality of domain access fields. After receipt of an activation of a selected one of the domain access fields, a third domain linked to the selected domain access field is accessed to retrieve target document data from the third domain. The second domain uploads the target document associated with the target document data to the first form of the first domain.

21 Claims, 4 Drawing Sheets

METHOD AND SYSTEM FOR PROVIDING A DOCUMENT IN A DATA COMMUNICATION NETWORK

CROSS-REFERENCE TO RELATED APPLICATIONS

The instant application claims priority under 35 U.S.C. §119 of prior Dutch patent application serial no. NL 2,012,867, filed May 22, 2014. The entire disclosure(s) of the above-mentioned and/or priority application(s) is hereby incorporated herein by this reference in its entirety for all purposes.

BACKGROUND

Field of the Disclosure

The invention relates to the field of information exchange in a data communication network. More specifically, the invention relates to a method and system for providing a document by a first party to a second party, in a data communication network. A use of the method and system of the invention is envisaged in applying for a job offered in an online environment, but not limited thereto.

Brief Discussion of Related Art

A common channel for companies to offer jobs is through generally accessible data communication networks, such as Internet. Anyone having a computer terminal accessing the data communication network may search for job offerings, and in many cases may apply for the job online.

As particular computer terminals having (wireless) communication capability, nowadays people use to a great extent smart phones and tablet computers. Both kinds of computer terminals are portable and are often used at arbitrary locations where access, in particular local access, to the communication network is available through a base station or a hotspot such as a Wifi access point.

When a candidate wishes to apply online for a job through a mobile terminal, in particular a smart phone or tablet computer, a problem arises when the domain offering the job requests the candidate to upload a digital curriculum vitae, CV, document. Although many candidates in fact have a digital CV file available for such purposes, the digital CV is usually stored at a location that is not on, or inaccessible from the smart phone or tablet computer. For example, a smart phone or tablet computer running under Apple's iOS operating system can upload a picture or video, but not a document file such as a digital CV document file. It is noted that on some portable terminals running under an Android operating system document files may be uploaded, but in many cases the necessary file is unavailable on the portable terminal. As a consequence of these circumstances, a candidate applying for a job is forced to complete his/her online job application at a later time from another computer terminal, or to perform the whole application procedure from the start again from another computer terminal in order to have the opportunity to upload a required digital CV document.

Similar problems may arise in other circumstances where a digital document needs to be uploaded to a domain, but is unavailable at the mobile terminal.

SUMMARY

It would be desirable to provide a method and system to mitigate or remove the above problems.

To better address this concern, in a first aspect of the invention a computer-implemented method of providing an electronic target document in a data communication network is provided. The method comprises the steps of:
  providing, by a first domain, a link to open a digital first form in the first domain;
  receiving, by the first domain, an activation of the link by a user;
  redirecting, by the first domain, to a second domain upon activation of the link, and providing a digital second form in the second domain, the second form comprising a retrieval field whereby, when the retrieval field is activated by the user, the second domain is configured to perform the following steps:
    providing a plurality of domain access fields;
    receiving an activation of a selected one of the domain access fields by the user;
    accessing a third domain linked to the selected domain access field; and
    retrieving target document data from the third domain,
  uploading, by the second domain, the target document associated with the target document data to the first form of the first domain.

Similarly, in the first aspect of the invention a computer-implemented method of providing an electronic target document in a data communication network is provided. The method comprises:
  redirecting from a first domain to a second domain upon activation of a link to open a digital first form in the first domain, and providing a digital second form in the second domain, the second form comprising a retrieval field whereby, when the retrieval field is activated by a user, the second domain is configured to perform the following steps:
    providing a plurality of domain access fields;
    receiving an activation of a selected one of the domain access fields by the user;
    accessing a third domain linked to the selected domain access field; and
    retrieving target document data from the third domain,
  uploading, by the second domain, the target document associated with the target document data to the first form of the first domain.

Herein, a domain is to be understood as a realm of administrative autonomy, authority of control in a network. The domain is constituted by software running in a defined computer system controlled by a defined entity. As an example, a domain of a company may be constituted by a website including a plurality of webpages. At least one of these webpages may offer a form to which a user can add information by input of specific data in specific fields displayed on a display of a computer device of a user, or by uploading a specific document. Some other fields such as the retrieval field, usually displayed as a button, allow and require an action by a user, such as by the user touching an area of a display screen in case of a touchscreen device, or e.g. by positioning a cursor on the field and activating the field by a mouse click, so as to activate the field, i.e. activate one or more software functions associated to the field.

In the context of the present invention, a first form requires at least uploading of a specific document by a user, and can further required the input of specific data in specific fields.

The method of the present invention, which can be implemented in various embodiments on different computer platforms, provides the advantage that a user, accessing a first form in a first domain on the first platform through a computer device, which first form requires uploading a digital document which is unavailable on the computer device, is presented with an opportunity to retrieve the document through a second domain from a third domain, and to upload it in the first form on the first domain, through the intervention of the second domain. As a consequence, the user may provide all required information, including the digital document, in the first form from an arbitrary computer device, in particular from a mobile computer device or wireless computer device lacking facilities to store the electronic document.

In a particular application of applying for a job, the first form is an application form of a company or an intermediary organization offering jobs of various companies. The third domain is a domain where a user has posted his/her CV to be registered as a person seeking a job. According to the invention, the second domain provides the user with access to his/her CV data, either in document or other form, in the third domain, and with the opportunity to upload the CV data in an appropriate format to the first form in the first domain.

In an embodiment of the method of the invention, the first form comprises at least one first data input field, and the second form further comprises at least one second data input field. The method further comprises: receiving, by the second domain, user data input at the at least one second data input field; and providing, by the second domain, the user data to the at least one first data input field.

When the first form requires a user to input data through at least one first data input field of the first form, the second form provides at least one second data input field in the second form. Advantageously, the data required to be input in the first form can be input in the at least one second data input field of the second form and, optionally after conversion of such data in a predetermined way, can be automatically provided to the first form in an appropriate format. Thus, the user need not swap between the first form and the second form, but only needs to provide information to the second form to obtain a result of thereby automatically providing information to the first form.

In an embodiment of the method of the invention, the second form is provided by the second domain by: retrieving the first form from the first domain; and converting the first form into the second form. The retrieval field is included in the second form.

An advantage of this conversion is that it ensures that all information required by the first form actually can be requested from the user, so that no information is missing. Additionally, the retrieval field is part of the second form to be used for retrieving the digital document by the second domain.

In an embodiment of the method of the invention, the first form comprises a document upload field, wherein the converting comprises changing the document upload field to the retrieval field.

Advantageously, by this conversion it is ensured that a document upload requested by the first form can take place through the intervention of the second domain providing a user with an option to retrieve the document by presenting the retrieval field for activation thereof.

In an embodiment of the method of the invention, the accessing, by the second domain, of a third domain linked to the selected domain access field comprises: storing user access credentials associated with the third domain in the second domain; and providing, by the second domain, the user credentials to the third domain to gain access to the third domain.

When the third domain can only be accessed by logon using user credentials, advantageously the second domain stores such user credentials for authorized users, such that the credentials can be used automatically, without further user intervention, any time needed. The user may have submitted such credentials when creating an account in the second domain.

In an embodiment of the method of the invention, the storing comprises: providing user access credential fields; receiving user access credentials input in the user access credential fields; and storing the received user credentials.

When a user does not have his/her credentials stored in the second domain at the time, advantageously the second domain requests such credentials to be used in accessing the third domain later, and stores the received user credentials for future use.

In an embodiment of the method of the invention, the method further comprises converting the target document data by the second domain into the target document.

The target document data may be retrieved by the second domain from the third domain in different formats. Some formats may be directly usable for upload in the first domain, e.g. when the first domain requires a PDF format, and the target document data actually constitute a PDF document. In other circumstances, the target document data are converted into a format required by the first domain according to predetermined conversion rules. The target document may be a PDF type file or an MS Word type file, or another type of file usable for upload to the first domain, in particular to the first form of the first domain.

In an embodiment of the method of the invention, the first, second and third domains are Internet domains.

In a second aspect of the present invention, a system for providing an electronic target document in a data communication network is provided. The system comprises a first domain, a second domain and a third domain in the data communication network. Each domain comprises at least one computer program containing computer instructions to cause a processor to perform specific actions.

The at least one computer program of the first domain is configured to provide a link to open a digital first form in the first domain, and to receive an activation of the link by a user.

The at least one computer program of the second domain is configured to provide a digital second form upon activation of the link by the user, the second form comprising a retrieval field whereby, when the retrieval field is activated by the user, the following steps are performed:
  providing a plurality of domain access fields;
  receiving an activation of a selected one of the domain access fields by the user;
  accessing a third domain linked to the selected domain access field; and
  retrieving target document data from the third domain, and
  upload the target document associated with the target document data to the first form of the first domain.

Similarly, in the second aspect of the invention a system for providing an electronic target document in a data communication network is provided. The system comprises a second domain in the data communication network. The second domain comprises at least one computer program containing computer instructions to cause a processor to perform specific actions, wherein the at least one computer program of the second domain is configured to:
  provide a digital second form upon activation of a link by a user to open a digital first form in a first domain, the second form comprising a retrieval field whereby, when the retrieval field is activated by the user, the following steps are performed:
provide a plurality of domain access fields;
receiving an activation of a selected one of the domain access fields by the user;
accessing a third domain linked to the selected domain access field; and
retrieving target document data from the third domain, and
upload the target document associated with the target document data to the first form of the first domain.

The system of the present invention, which can be implemented in various embodiments on different computer platforms, provides the advantage that a user, accessing a first form in a first domain on the first platform through a computer device, which first form requires uploading a digital document which is unavailable on the computer device, is presented with an opportunity to retrieve the document through a second domain from a third domain, and to upload it in the first form on the first domain, through the intervention of the second domain. As a consequence, the user may provide all required information, including the digital document, in the first form from an arbitrary computer device, in particular from a mobile computer device or wireless computer device lacking facilities to store the electronic document.

In a third aspect of the present invention, a second domain in a data communication network for providing an electronic target document in the data communication network is provided. The second domain comprises at least one computer program containing computer instructions to cause a processor to perform specific actions, wherein the at least one computer program of the second domain is configured to:
provide a digital second form upon activation of a link by a user to open a digital first form in a first domain, the second form comprising a retrieval field whereby, when the retrieval field is activated by the user, the following steps are performed:
providing a plurality of domain access fields;
receiving an activation of a selected one of the domain access fields by the user;
accessing a third domain linked to the selected domain access field; and
retrieving target document data from the third domain, and
upload the target document associated with the target document data to the first form of the first domain.

In a fourth aspect of the present invention, a computer program enabling one or more processors to carry out the method of the invention is provided.

BRIEF DESCRIPTION OF THE DRAWINGS

These and other aspects of the invention will be more readily appreciated as the same becomes better understood by reference to the following detailed description and considered in connection with the accompanying drawings in which like reference symbols designate like parts.

DETAILED DESCRIPTION OF THE EMBODIMENTS

Figure 1:
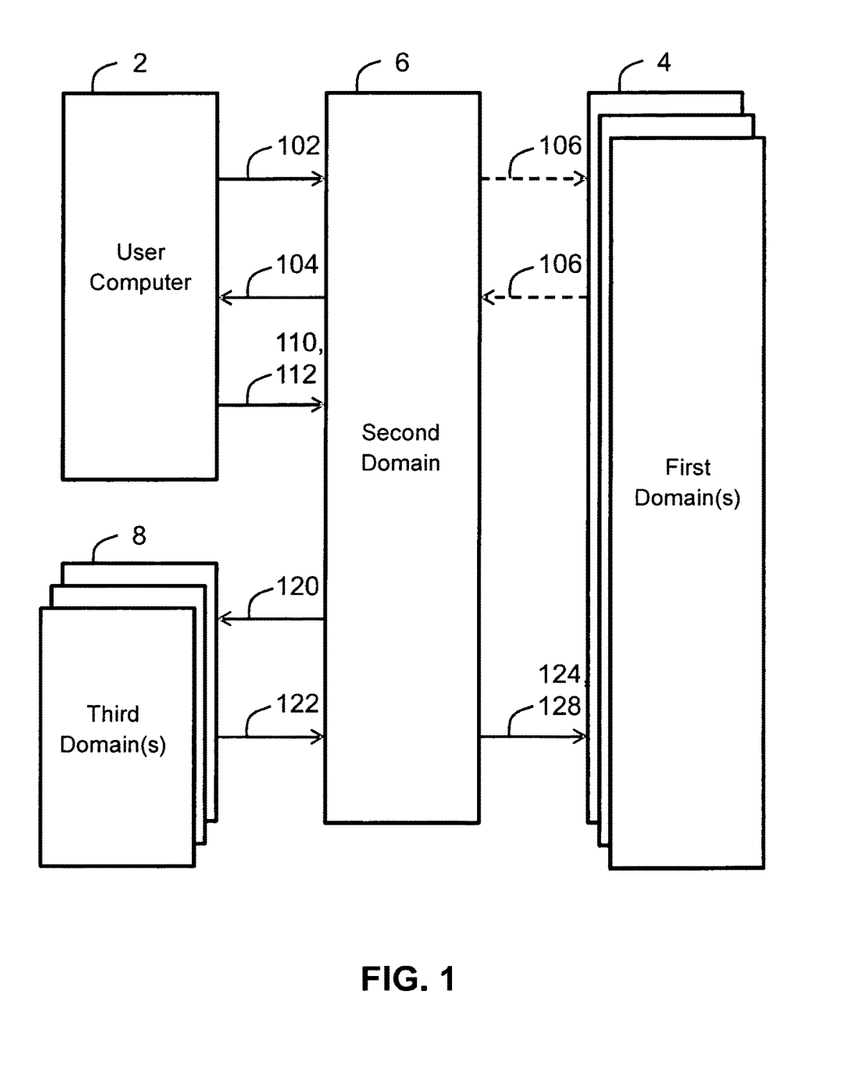
FIG. 1 schematically depicts different domains on computing devices interacting in the method and system of the present invention, and data flows between the domains.

FIG. 1 depicts a user computer 2 interacting directly or indirectly with a first domain 4 on a first server system, a second domain 6 on a second server system, and a third domain 8 on a third server system. As illustrated by a series of overlapping blocks in FIG. 1, there may be a plurality of first domains 4, only one of which is accessed at the time by the user computer 2, and there may also be a plurality of third domains 8, only one of which is accessed at the time by the user computer 2. The first, second and third server systems may physically be on one or more computers/servers.

Data input to, and data output from the user computer 2, first domain 4, second domain 6 and third domain 8 takes place in known ways. For example, the user computer 2 may be a personal computer comprising a keyboard, a pointing device, and/or a display for input and output of data. In particular, the user computer 2 is a tablet computer or a smartphone comprising a touchscreen user interface for input and output of data, but lacking a storage of digital user documents, or specific user documents.

Data can be exchanged between the user computer 2 and any of the first domain 4, the second domain 6, and the third domain 8, for example by telecommunication, network communication or any other communication facility. Data exchange is symbolized by arrows, where solid lines indicate a process flow, and dashed lines relate to optional process flow depending on particular process implementations.

In the following, reference is made to FIGS. 1-6. Activation of fields in user interfaces (forms) depicted in FIGS. 3-6 can be made by locating a pointing symbol in the field and submitting an activation command such as a click or <enter> command, or by touching the field in a touchscreen type interface.

In an embodiment of the method of the present invention, a user wishes to submit user data from his/her user computer 2 to a digital first form in the first domain 4 hosted on the first server system. In addition to providing the user data, it is mandatory to upload an electronic document in the first domain 4 which is not available on the user computer 2 or the first server system.

The user operates the user computer 2 to find the first domain 4 on the first server system, the first domain 4 providing a link to the first form.

According to step 100 (FIG. 2), the user activates the link, i.e. activates a software function associated with the link.

Figure 2:
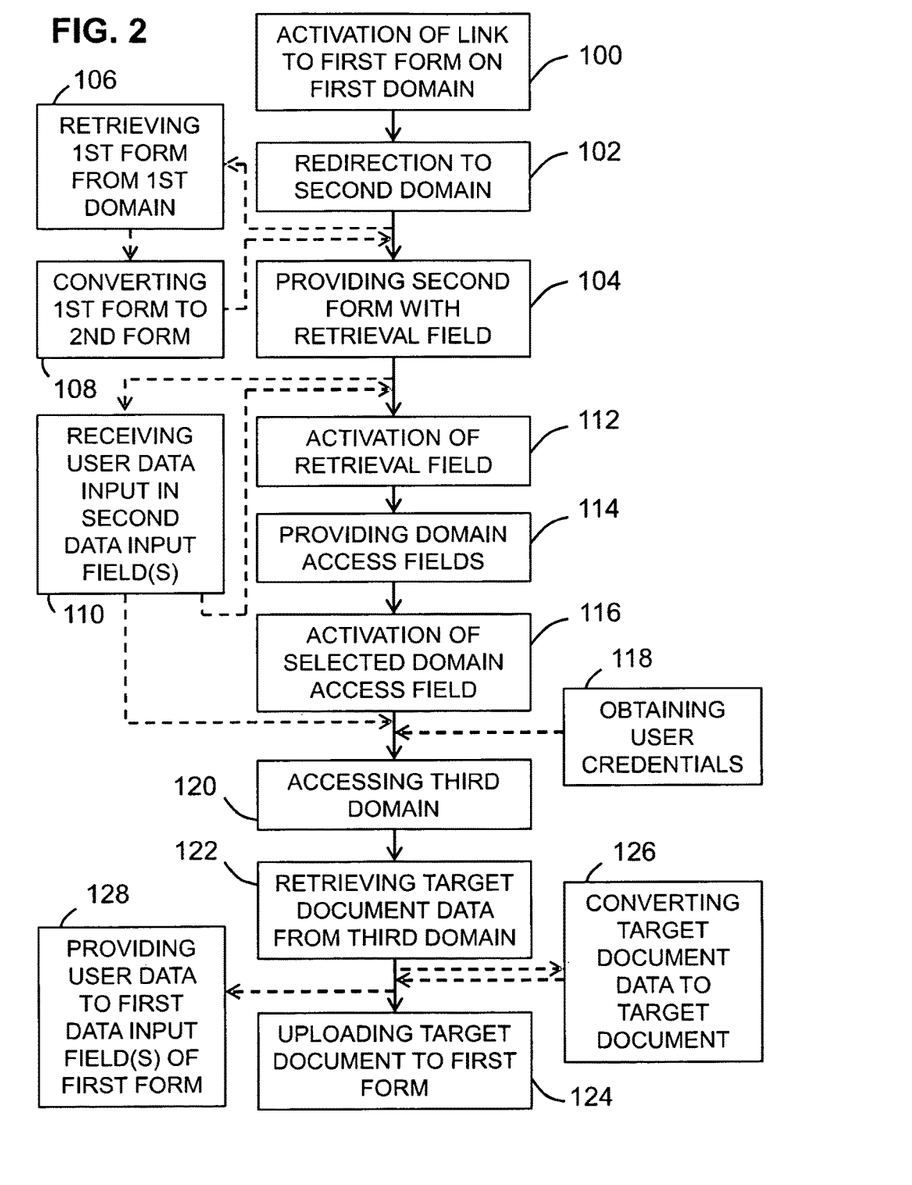
FIG. 2 depicts a flow diagram explaining actions taken in embodiments of the different domains of FIG. 1.

According to step 102, the user, by activating the link, is redirected to the second domain 6 hosted on the second server system.

According to step 104, the second domain 6 provides a digital second form 30 associated with the first form to the user through the user computer 2. The second form 30 provides one or more data input fields 32 (if present), a document retrieval field 34, and a submit field 36, as exemplified in FIG. 3.

Figure 3:
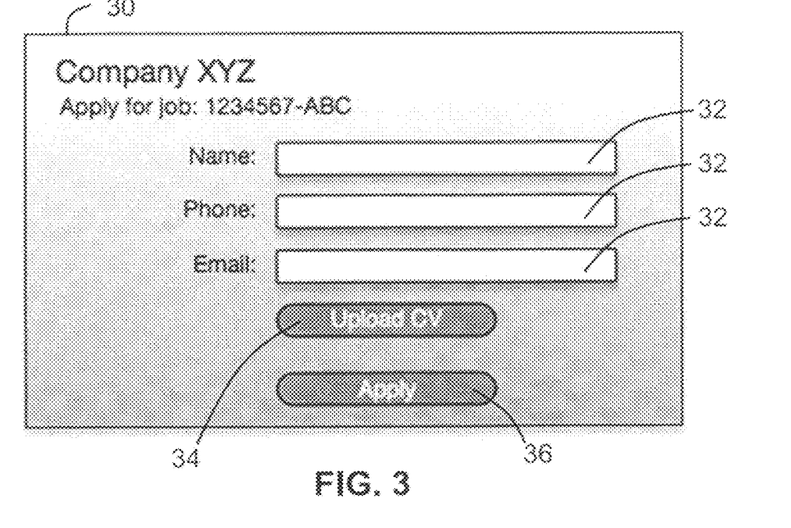
FIGS. 3-6 depict non-limiting examples of user interfaces that may be generated in embodiments of the method and system of the present invention.

The second form 30 may be directly available in the second domain 6 on the second server system. Optionally, when the second form 30 is not available, to enable the second domain 6 to provide the second form 30 in accordance with step 104, the second domain 6 retrieves the first form from the first domain system 4 (according to step 106). The second domain 6 then converts the first form into the second form 30 (according to step 108), including the document retrieval field 34 and the submit field 36 as shown in FIG. 3.

The user, having access to the second form 30, in addition to providing data in the one or more data input fields 32 (according to step 110), according to step 112 activates the document retrieval field 34 (i.e. activates software functionality) to retrieve target document data required in the process.

Figure 4:
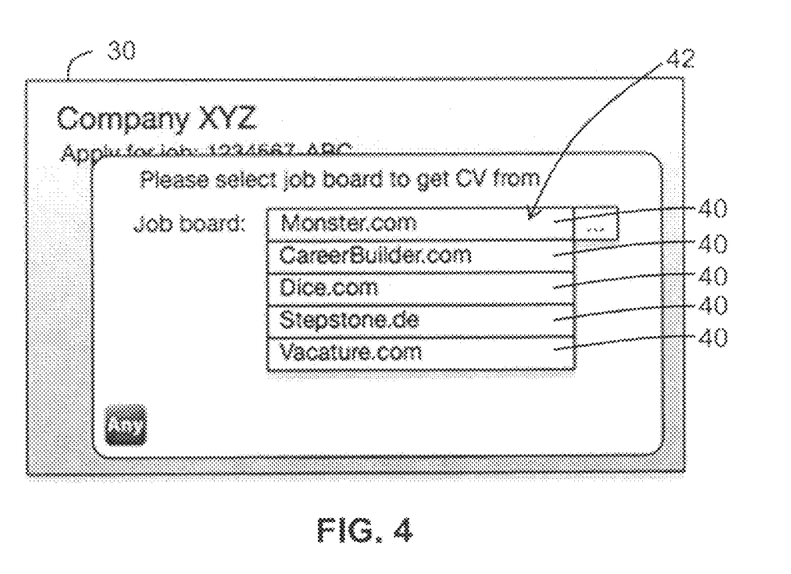

By activating the document retrieval field 34, according to step 114 the second domain 6 provides a set of different domain access fields 40, as illustrated in FIG. 4.

According to step 116, the user activates a selected domain access field 42 of the domain access fields 40, thereby indicating a third domain 8 on the third server system to be accessed by the second domain 6 for retrieval of the target document data from the third domain 8.

Figure 5:
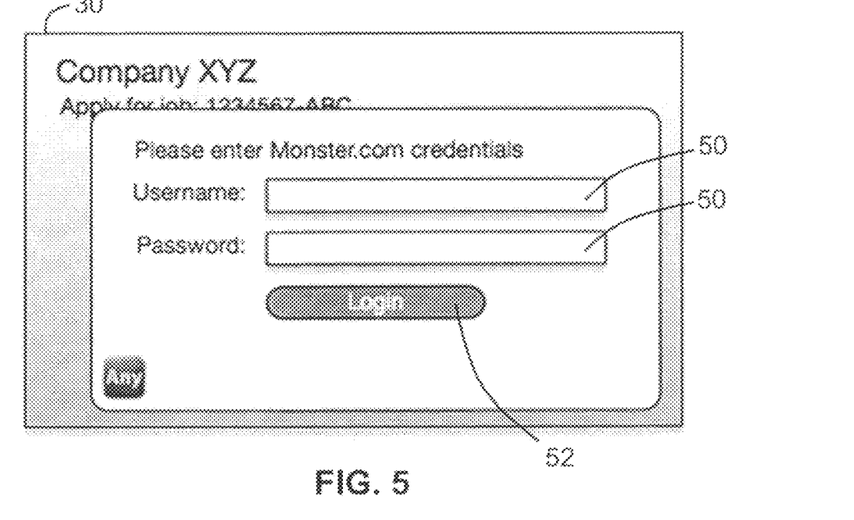

Activating the selected domain access field 42 may cause the second domain 6 to directly access the third domain 8, and retrieve the target document data from the third domain 8, in particular when the second domain 6 stores login credentials of the user to the third domain 8. Such login credentials may have been stored in an account held by the second domain 6 on the second server system. Optionally, when the second domain 6 does not store the login credentials of the user to the third domain 8, according to step 118 the second domain 6 may provide login data input fields 50 and a login submit field 52 to the user as illustrated in FIG. 5, whereby user credentials can be obtained.

After the user has input the required data in the login data input fields 50, and has activated the login submit field 52, the second domain 6 accesses the third domain 8 (according to step 120), and retrieves the target document data from the third domain (according to step 122).

Figure 6:
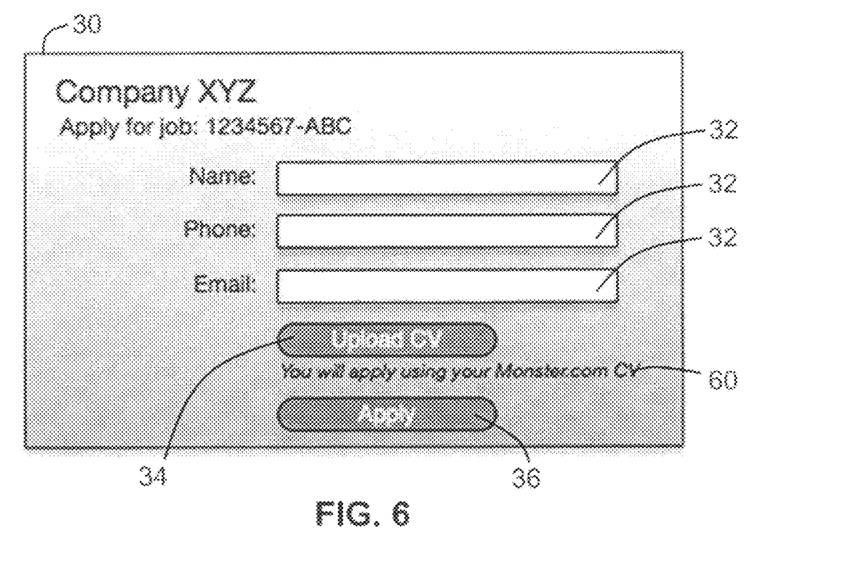

Alternatively, the second domain 6 stores the data input in the login data input fields 50 in association with data associated with the selected domain access field 42, and subsequent activation of the login submit field 52 only leads to the display of a message 60 in the second form 30 as illustrated in FIG. 6, indicating the specific third domain 8 associated with the selected domain access field 42.

Next, as further illustrated in FIG. 6, and when the user has input data into the data input fields 32 (if applicable), the user may activate the submit field 36.

If the target document data have already been retrieved from the third domain 8, and if they are in a target document format accepted by the first domain 4, such as in a PDF type format or in an MS Word type format or another type of format, then the target document is uploaded to the first form in the first domain 4 by the second domain 6, according to step 124. If the target document data are not in a format accepted by the first domain 4, then according to step 126 the target document data are converted into a target document having a format accepted by the first domain 4, before the upload takes place.

If the target document data have not yet been retrieved from the third domain 8, steps 120, 122 will be performed first after activation of the submit field 36. If the retrieved target document data are in a target document format accepted by the first domain 4, such as in a PDF type format or in an MS Word type format or in another type of format, then the target document is uploaded to the first form in the first domain 4 by the second domain 6, according to step 124. If the target document data are not in a format accepted by the first domain 4, then according to step 126 the target document data are converted into a target document having a format accepted by the first domain 4, before the upload takes place.

If applicable, the user data input by the user into the second form 30 are provided to the first data input field(s) of the first form, according to step 128, whereby the second domain 6 provides the user data to the first domain 4.

Thus, the second domain 6 according to the invention enables a user to provide complete data input in a first form of a first domain 4, including submission of a required digital target document which is not directly at the disposal of the user at his/her user computer 2.

The method and system as explained above may be used by a user to apply for a job. The user accesses the first domain 4, which may also be referred to as a job application domain, where an application can be made. Then, after activation of a link leading to a specific first form to apply for a specific job, the user is redirected to the second domain 6, which may also be referred to as an (intermediary) organization domain, where the user can provide user data in a second form, and indicate a third domain 8, which may also be referred to as a job board server, to retrieve CV data from. Then, the job application can be completed by the second server uploading all information retrieved from the user and the third domain 8 to the first form.

As explained in detail above, in a computer-implemented method and system, an electronic target document is provided in a data communication network. At least one computer program in a first domain in the data communication network provides a link to open a digital first form in the first domain. Upon activation of the link, redirection to a second domain takes place, and a second electronic form is provided in the second domain. The second form comprises a retrieval field which is configured to provide, when the retrieval field is activated, a plurality of domain access fields. After receipt of an activation of a selected one of the domain access fields, a third domain linked to the selected domain access field is accessed to retrieve target document data from the third domain. The second domain uploads the target document associated with the target document data to the first form of the first domain.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

A single processor or other unit may fulfil the functions of several items recited in the claims.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

A computer program may be stored and/or distributed on a suitable medium, such as an optical storage medium or a solid-state medium supplied together with or as part of other hardware, but also be distributed in other forms, such as via the Internet or other wired or wireless telecommunication systems.

What is claimed is:

1. A computer-implemented method of providing an electronic target document in a data communication network, the method comprising:
   providing, by a first domain on a first server system, a link to open a digital first form in the first domain;
   receiving, by the first domain, an activation of the link by a user from a user computer device;
   redirecting, by the first domain, to a second domain on a second server system upon activation of the link, and providing a digital second form in the second domain, the second form comprising a retrieval field whereby, when the retrieval field is activated by the user from the user computer device, the second domain is configured to perform the following steps:
      providing a plurality of domain access fields;
      receiving an activation of a selected one of the domain access fields by the user from the user computer device;
      accessing a third domain on a third server system linked to the selected domain access field; and
      retrieving target document data from the third domain,
   uploading, by the second domain, the target document associated with the target document data to the first form of the first domain.

2. The method of claim 1, wherein the first form comprises at least one first data input field, wherein the second form further comprises at least one second data input field, and wherein the method further comprises:
   receiving, by the second domain, user data input from the user computer device at the at least one second data input field; and
   providing, by the second domain, the user data to the at least one first data input field.

3. The method of claim 1, wherein the second form is provided by the second domain by:
   retrieving the first form from the first domain; and
   converting the first form into the second form,
   wherein the retrieval field is included in the second form.

4. The method of claim 3, wherein the first form comprises a document upload field, and wherein the converting comprises:
   changing the document upload field to the retrieval field.

5. The method of claim 1, wherein the accessing, by the second domain, of a third domain linked to the selected domain access field comprises:
   storing user access credentials associated with the third domain in the second domain; and
   providing, by the second domain, the user credentials to the third domain to gain access to the third domain.

6. The method of claim 5, wherein the storing comprises:
   providing user access credential fields;
   receiving user access credentials input from the user computer device in the user access credential fields; and
   storing the received user credentials.

7. The method of claim 1, further comprising:
   converting the target document data by the second domain into the target document.

8. The method of claim 1, wherein the target document is a PDF file or an MS Word file.

9. The method of claim 1, wherein the first, second and third domains are Internet domains.

10. A computer-implemented method of providing an electronic target document in a data communication network, the method comprising:
    redirecting from a first domain on a first server system to a second domain on a second server system upon activation of a link to open a digital first form in the first domain, and providing a digital second form in the second domain, the second form comprising a retrieval field whereby, when the retrieval field is activated by a user from a user computer device, the second domain is configured to perform the following steps:
       providing a plurality of domain access fields;
       receiving an activation of a selected one of the domain access fields by the user from a user computer device;
       accessing a third domain on a third server system, the third domain being linked to the selected domain access field; and
       retrieving target document data from the third domain,
    uploading, by the second domain, the target document associated with the target document data to the first form of the first domain.

11. A system for providing an electronic target document in a data communication network, the system comprising a first domain on a first server system, a second domain on a second server system and a third domain on a third server system in the data communication network, each domain comprising at least one computer program containing computer instructions to cause a processor to perform specific actions, wherein:
    the at least one computer program of the first domain is configured to provide a link to open a digital first form in the first domain, and to receive an activation of the link by a user from a user computer device;
    the at least one computer program of the second domain is configured to:
       provide a digital second form upon activation of the link by the user from the user computer device, the second form comprising a retrieval field whereby, when the retrieval field is activated by the user from the user computer device, the following steps are performed:
          providing a plurality of domain access fields at the user computer device;
          receiving an activation of a selected one of the domain access fields by the user from the user computer device;
          accessing a third domain linked to the selected domain access field; and
          retrieving target document data from the third domain, and
       upload the target document associated with the target document data to the first form of the first domain.

12. The system of claim 11, wherein the first form comprises at least one first data input field, wherein the second form further comprises at least one second data input field, and wherein the at least one computer program of the second domain further is configured to:
receive user data input from the user computer device at the at least one second data input field; and
provide the user data to the at least one first data input field.

13. The system of claim 11, wherein the at least one computer program of the second domain further is configured to provide the second form by:
retrieving the first form from the first domain;
converting the first form into the second form,
wherein the retrieval field is included in the second form.

14. The system of claim 13, wherein the first form comprises a document upload field, and wherein the converting comprises:
changing the document upload field to the retrieval field.

15. The system of claim 11, wherein the at least one computer program of the second domain further is configured to access a third domain linked to the selected domain access field by:
storing user access credentials associated with the third domain in the second domain; and
providing the user credentials to the third domain to gain access to the third domain.

16. The system of claim 15, wherein the storing comprises:
providing user access credential fields;
receiving user access credentials input from the user computer device in the user access credential fields; and
storing the received user credentials.

17. The system of claim 11, wherein the at least one computer program of the second domain further is configured to:
convert the target document data into the target document.

18. The system of claim 11, wherein the target document is a PDF file or an MS Word file.

19. The system of claim 11, wherein the first, second and third domains are Internet domains each having a unique URL.

20. A system for providing an electronic target document in a data communication network, the system comprising a second domain on a second server system in the data communication network, the second domain comprising at least one computer program containing computer instructions to cause a processor to perform specific actions, wherein the at least one computer program of the second domain is configured to:
provide a digital second form upon activation of a link by a user from a user computer device to open a digital first form in a first domain on a first server system, the second form comprising a retrieval field whereby, when the retrieval field is activated by the user from the user computer device, the following steps are performed:
providing a plurality of domain access fields;
receiving an activation of a selected one of the domain access fields by the user from the user computer device;
accessing a third domain on a third server system, the third domain being linked to the selected domain access field; and
retrieving target document data from the third domain, and
upload the target document associated with the target document data to the first form of the first domain.

21. A second domain on a second server system in a data communication network for providing an electronic target document in the data communication network, the second domain comprising at least one computer program containing computer instructions to cause a processor to perform specific actions, wherein the at least one computer program of the second domain is configured to:
provide a digital second form upon activation of a link by a user from a user computer device to open a digital first form in a first domain on a first server system, the second form comprising a retrieval field whereby, when the retrieval field is activated by the user from the user computer device, the following steps are performed:
providing a plurality of domain access fields;
receiving an activation of a selected one of the domain access fields by the user from the user computer device;
accessing a third domain on a third server system, the third domain being linked to the selected domain access field; and
retrieving target document data from the third domain, and
upload the target document associated with the target document data to the first form of the first domain.

* * * * *